Oct. 20, 1936.　　　H. F. MONTAGUE　　　2,058,169
ELECTRICALLY OPERATED WELDER'S HOOD
Filed Oct. 19, 1933　　　2 Sheets-Sheet 1
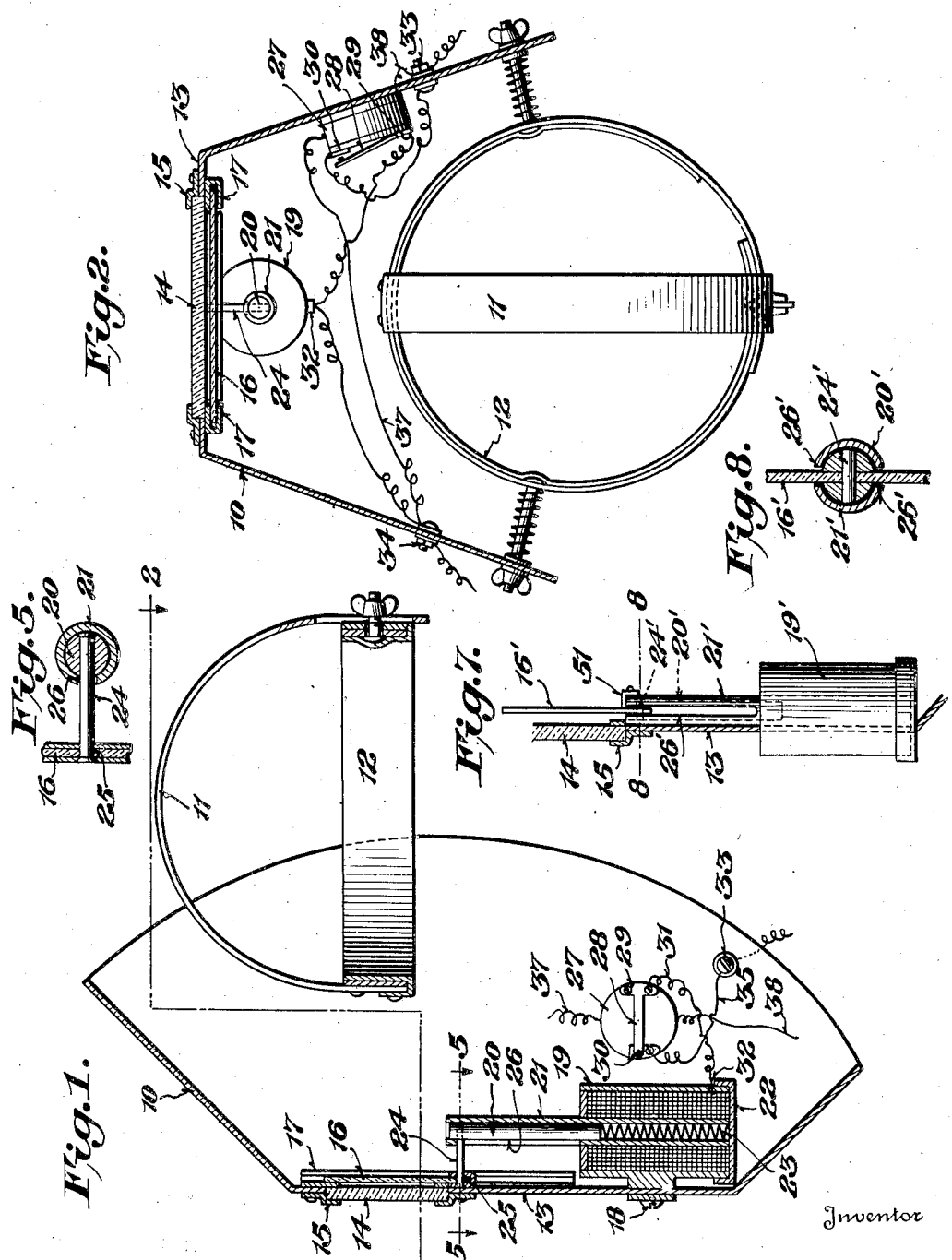
Inventor
Homer Frost Montague,
By Ivan P. Tashof,
Attorney Oct. 20, 1936.    H. F. MONTAGUE    2,058,169
ELECTRICALLY OPERATED WELDER'S HOOD
Filed Oct. 19, 1933    2 Sheets-Sheet 2
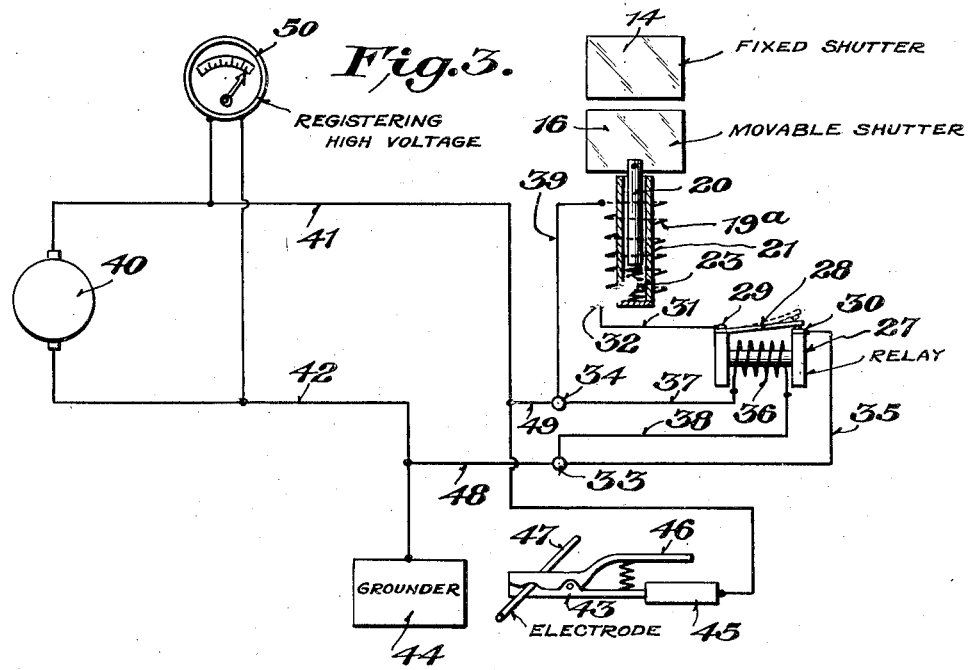
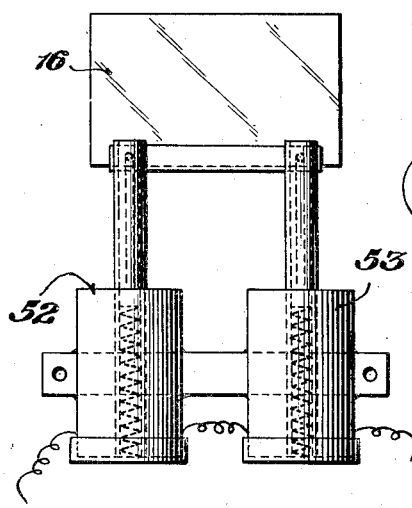
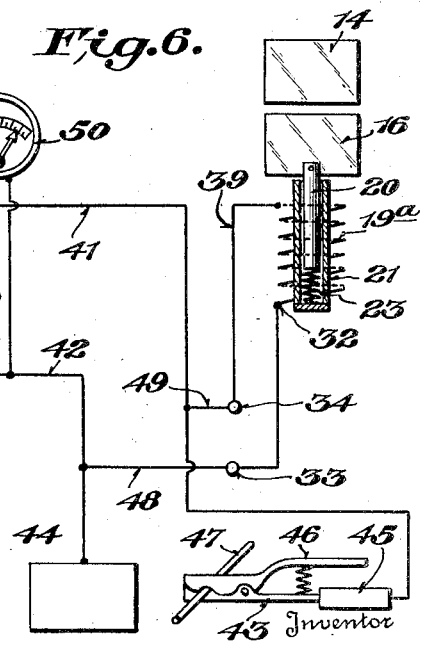
Homer Frost Montague,
By Ivan P. Tashof,
Attorney Patented Oct. 20, 1936

2,058,169

UNITED STATES PATENT OFFICE 2,058,169

ELECTRICALLY OPERATED WELDER'S HOOD

Homer Frost Montague, Lexington, Ky., assignor of one-half to Joseph A. Saunier, Lexington, Ky.

Application October 19, 1933, Serial No. 694,311

3 Claims. (Cl. 2—8)

The present invention relates to improvements in electrically operated shields for use wherever it is necessary or desirable to protect operators from harmful radiation.

One of the fields in which the present invention may be employed is that relating to processes and apparatus utilizing the electric arc, and more particularly the metal coating, welding and like arts.

It has heretofore been proposed to electrically operate shields for protecting workmen from rays generated by the electrical arc, but as far as known none of these devices have been entirely satisfactory. In accordance with the present invention, the protective shield is operated by a fall or decrease in voltage when the welding circuit is closed prior to drawing the arc.

One of the objects of the present invention is to provide a method of protecting workmen from the harmful radiations produced by welding and similar operations, said method under all working conditions providing protection to the workmen.

Another object of the present invention is the provision of means for assuring protection to the workmen under all operating conditions.

A further object is to provide in combination with an electric arc welding apparatus magnetic means operating on "open voltage" for withdrawing a shutter from a protective position where it intercepts radiation harmful to the operator to a non-protective position, and non-magnetic means for returning the shutter to a protective position when the welding apparatus is operating on "closed voltage".

A still further object of the invention in its preferred form is to provide in combination with an electric arc apparatus a shutter movable to and from registry with a window to intercept in its closed position radiations harmful to an operator, magnetic means for moving the shutter into a non-protective position, non-magnetic means for moving the shutter to a protective position, and connections between the arc apparatus and the magnetic means functioning to cause the latter to actuate the shutter to a non-protective position and to cause the non-magnetic means to actuate the shutter to a protective position, said connections including separate means, preferably a relay member, adapted to break the circuit connections to the magnetic means and allow the non-magnetic means to actuate the shutter to a protective position.

Another object of the present invention is to provide simple means for connecting the removable shutter to the magnetic means.

Further objects and advantages will appear from the following description taken in connection with the accompanying drawings, in which:

Figure 1 is a vertical section through the welding hood showing the solenoid for operating the movable screen, and a relay adapted in its closed position to energize the solenoid and to deenergize the same in its opened position;

Fig. 2 is a horizontal cross section taken on line 2—2 of Fig. 1;

Fig. 3 is a wiring diagram;

Fig. 4 is an elevational view showing a modified solenoid arrangement for operating the movable shield;

Fig. 5 is a detailed section on line 5—5 of Fig. 1, showing the manner of mounting the movable shutter on the solenoid armature or core;

Fig. 6 is a modified form of the wiring diagram in which the relay is omitted;

Fig. 7 is a detail showing a modified manner of mounting the movable shutter on the armature core;

Fig. 8 is a detailed section on the line 8—8 of Fig. 7 showing a modified manner of mounting the movable shutter on the solenoid armature or core.

Referring to the drawings, 10 is the welder's hood provided with head bands 11 and 12 adjustably connected to each other. The front face 13 of the hood has mounted thereon, preferably at its upper portion, a fixed window or lens 14 which is carried by a suitable frame member, as for example the frame 15. A movable protective screen or lens 16 is provided which in its closed position intercepts all of the harmful radiations passing through the fixed screen or lens 14. This movable screen is carried by a suitable frame member, for example frame 17, which is shown integral with the frame 15. However, it is obvious that it need not be integral.

While the lenses of the fixed window 14 and the movable screen or shutter 16 may be made of various materials, it is preferable that the lens of the fixed window 14 be gold tinted, but of course not to such an extent as to prevent clear vision. The gold-tinted lens will to a large extent absorb the infra-red and ultra-violet and to a substantially less extent the visible rays. The lens of the movable screen 16 is preferably a blue green glass, although amber glass or green glass may be used.

Fixed preferably to the lower portion of the face or wall 13 of the hood as at 18 is a solenoid 19, provided with a core member or armature 20 adapted to telescopically move in a feebly magnetic guide tube 21 which preferably extends longitudinally substantially entirely the depth of the solenoid. A spring 23 is provided to work in opposition to the magnetic pull or force of the solenoid 19. The spring may be located in various positions as long as it accomplishes the function above set forth. However, preferably it is positioned in the lower portion of the guide tube 21 and may extend into the upper portion of the armature 20.

Any suitable means may be provided to operably connect the armature 20 with the movable screen 16. Preferably the armature has fixed thereon a pin 24 which protrudes into the aperture 25 of the movable screen 16 and rides longitudinally in the slot 26 of the guide tube 21.

A relay 27 of any suitable type which will make and break the electrical circuit is provided in series with the solenoid 19. The relay carries a yieldingly movable armature or arm 28 which is fixed at point 29 and makes the solenoid circuit by contacting with a contact 30. Connected to the contact 29 is a wire 31, the other end of the wire being connected to the coil 19a of the solenoid at the point 32. The shield or hood 10 carries terminals 33 and 34. The wire 35 completes the circuit between the relay contact 30 and the terminal 33. In the wiring diagram shown in Fig. 3, the hood terminals are indicated at the points 33 and 34. The magnetic coil 36 of the relay is connected in circuit by means of the wires 37 and 38. From the hood terminal 34 a wire 39 connects with the solenoid coil 19a.

The source of the welding current may be any of the usual sources, but is shown by way of example as a generator 40. Welding current wires 41 and 42 lead respectively to the welding electrode 43 and the grounding plate 44. The electrode 43 has an insulated handle 45 and the usual rod clamping device 46 adapted to hold any size of welding rod 47. Leading from the terminals 33 and 34 are wires 48 and 49 shunted across the welding circuit wires 41 and 42.

In operating, the first step is to set the voltage coming from the source 40 at the proper potential which will of course vary with the actual operating conditions, including the character of the article to be welded, its position, and the character of the welding material. The welding circuit is of course open and the testing volt meter 50 will register what is known as the "open voltage". When the welding circuit is open, that is before the welding rod 47 is applied to the work, the relay contact arm 28 is in its closed position and high potential current is passing through the relay coil 36 functioning to keep the relay arm 28 in its closed position, and thereby allow higher potential current to pass through the solenoid 19 and energize the armature 20 which is connected to the movable shutter 16. The magnetic force generated by the solenoid is sufficiently strong to provide a magnetic flux functioning to keep the armature 20 in its retracted position against the tension of the spring 23, as shown in Fig. 3. It is therefore clear that when the welding circuit is open and operating on "open voltage", the movable screen or shutter 16 is in its retracted position, and the welding operator can clearly see through the window 14.

As soon as the welding rod 47 is applied to the work, the voltage drops. For example, if the open voltage is about 50 volts, on drawing the welding arc the voltage may drop to about 15 or 20 volts. Of course, the drop in voltage will vary somewhat in accordance with the length of the welding arc drawn by the operator. Upon the drop in voltage, naturally the current passing through the relay coil 36 drops, and therefore there is less magnetic pull on the armature 28 which results in the armature 28 assuming its open position, indicated by dotted lines in Fig. 3. The armature 28 is preferably made in the form of a spring, but it may be made of a rigid material and other spring means employed to allow it to make and break the circuit as the voltage varies. When the armature 28 assumes its open position, no current passes through the solenoid coil 19a, and consequently the core or armature 20 has its magnetic attraction reduced to substantially zero. As a result, the spring 23 functions to push the armature 20 carrying the protective movable screen 16 upwardly to a position opposite the window 14 to thereby protect the operator from the harmful radiations produced during the welding operation.

It is to be noted that the manner in which the present device operates is that as soon as the welding operation starts current ceases to flow through the solenoid coil 19. It has been hitherto proposed to utilize an electromagnet to open and close a shutter to protect the workman. However, in the prior devices, when the welding operation starts, the current flows through the electromagnet to actuate the shutter to a protective position. This method of operation is distinctly disadvantageous as, if the electromagnetic circuit is broken for any reason whatsoever and the welding operation continues, as it ordinarily does, the shutter fails to remain closed and protect the workman.

That the presence of the relay in the circuit is of a distinct advantage is obvious in view of the following explanation. With the relay present in the circuit, if the operator draws a long arc and the fall of voltage is extremely small, the relay will open the solenoid circuit, permitting it to close the movable shutter 16 instantly, due to the fact that even a small drop in voltage will be sufficient to open the contact arm 28. When the relay is absent from the circuit and such an arrangement is shown in Figure 6, if the operator draws a long arc, the drop in voltage may be extremely small, as previously set forth, but this small drop in voltage may be insufficient to decrease the magnetic flux generated in the solenoid coil 19a to such an extent as to allow the spring 23 to push the armature 20 and the screen 16 carried thereby to a fully protective position. There may be other factors besides the drawing of a long arc in the electric circuit producing merely a small drop in voltage, and in the absence of a relay the shutter or screen 16 may not be brought to its fully protective position. In the actual use of the present device, in the absence of a relay or a small drop in voltage across the welding terminals, it has been observed that the shutter at times is only almost closed, and at other times it is only, for example, about three-quarters closed. However, if the voltage drop is sufficient, the relay may be eliminated and then the circuit appears, as set forth in Fig. 6, which represents an operative circuit when the voltage drop is a substantial one.

As shown in Fig. 4, the movable shutter 16 may be operated by the two solenoids 52 and 53 instead of a single solenoid.

Figures 7 and 8 show a modified form of mounting the movable shutter 16 on the armature core 20'. Instead of providing a single slot in the guide tube, as shown in Fig. 1, the guide tube 21' carries diametrically opposed slots 26'. The movable shutter 16 is fixed to the armature 20' by any suitable means, such as a pin or screw 24'. The movable shutter 16' moves in the slots 26' from an open to a closed position. A suitable stop member 51 is provided to limit the upward stroke of the armature 20'.

What I claim is:

1. In combination with an electric arc apparatus, a shield having a window therein, a shutter movable to and from a position in registry with said window, magnetic means for moving said shutter into a non-protective position, non-magnetic means for moving said shutter to a protective position, and connections between the arc apparatus and said magnetic means adapted to cause the magnetic means to actuate the shutter to a non-protective position and to cause the non-magnetic means to actuate the shutter to a protective position, said connections including a relay member adapted to break the circuit connections of the magnetic means and allow the non-magnetic means to actuate the shutter to a protective position.

2. In combination with an electric arc apparatus, a shield having a window therein, a shutter movable to and from a position in registry with said window, a solenoid for moving said shutter into a non-protective position, non-magnetic means for moving said shutter to a protective position, and connections between the arc apparatus and a solenoid adapted to cause the latter to actuate the shutter to a non-protective position and to cause the non-magnetic means to actuate the shutter to a protective position, said connections including a relay member adapted to break the circuit connections of the solenoid and allow the non-magnetic means to actuate the shutter to a protective position.

3. In combination with an electric arc apparatus, a shield having a window therein, a shutter movable to and from a position in registry with said window, magnetic means for moving said shutter into a non-protective position, non-magnetic means for moving said shutter to a protective position, and connections between the arc apparatus and said magnetic means adapted to cause the magnetic means to actuate the shutter to a non-protective position and to cause the non-magnetic means to actuate the shutter to a protective position, said connections including means adapted to break the circuit connections of the magnetic means and allow the non-magnetic means to actuate the shutter to a protective position.

HOMER FROST MONTAGUE.